(12) United States Patent
Ramachandran et al.

(10) Patent No.: US 10,986,767 B2
(45) Date of Patent: *Apr. 27, 2021

(54) USING SMART-PHONES AND OTHER HAND-HELD MOBILE DEVICES IN PRECISION AGRICULTURE

(71) Applicant: AgJunction LLC, Scottsdale, AZ (US)

(72) Inventors: Subramanian R. Ramachandran, Scottsdale, AZ (US); Mark Alan Villela, Glendale, AZ (US)

(73) Assignee: AGJUNCTION LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/938,821

(22) Filed: Jul. 24, 2020

(65) Prior Publication Data

US 2020/0352083 A1 Nov. 12, 2020

Related U.S. Application Data

(63) Continuation-in-part of application No. 16/570,358, filed on Sep. 13, 2019.
(Continued)

(51) Int. Cl.
*G05D 1/02* (2020.01)
*A01B 69/04* (2006.01)
(Continued)

(52) U.S. Cl.
CPC .......... *A01B 69/008* (2013.01); *A01B 79/005* (2013.01); *G05D 1/0016* (2013.01);
(Continued)

(58) Field of Classification Search
CPC .......... G06N 20/00; G06N 5/04; G06N 20/10; G06N 3/02; G06N 3/08; G06N 3/082;
(Continued)

(56) References Cited

U.S. PATENT DOCUMENTS 5,194,851 A   3/1993  Kraning et al.
5,390,125 A   2/1995  Sennott et al.
(Continued)

OTHER PUBLICATIONS

Dyke et al., GNSS Real Time Performance Monitoring and CNS/ATM Implementation, 2006, IEEE, p. 1137-1144 (Year: 2006).*
(Continued)

*Primary Examiner* — Mcdieunel Marc
(74) *Attorney, Agent, or Firm* — Schwabe Williamson & Wyatt

(57) ABSTRACT

Some embodiments may include a control system configured to monitor an online queue associated with a remote server for the presence of updated control software content; in the case of the presence of updated control software content in the online queue, provide data based thereon in an offline queue, wherein a portable computing device includes a storage for the offline queue; waiting for a time period in which a wired communication interface of the portable computing device is attached to a wired interface of the vehicle or a wireless communication interface of the vehicle is in range of a wireless communication interface of the portable computing device; and in the time period, transferring contents of the offline queue to the vehicle, wherein a processor of the vehicle distributes update(s) included in the contents to one or more of the GNSS receiver, the actuator assembly, and the steering control module.

20 Claims, 7 Drawing Sheets

Related U.S. Application Data

(60) Provisional application No. 62/879,252, filed on Jul. 26, 2019, provisional application No. 62/731,698, filed on Sep. 14, 2018.

(51) Int. Cl.

| | |
|---|---|
| *A01B 79/00* | (2006.01) |
| *G05D 1/00* | (2006.01) |
| *G06F 5/06* | (2006.01) |
| *H04W 4/021* | (2018.01) |

(52) U.S. Cl.
CPC .......... *G05D 1/0219* (2013.01); *G06F 5/065* (2013.01); *H04W 4/021* (2013.01); *G05D 2201/0201* (2013.01)

(58) Field of Classification Search
CPC .... G06N 3/088; A01B 79/005; A01B 69/008; A01B 69/00; A01B 69/004; A01B 69/001; A01B 79/00; A01B 79/02; G05D 2201/0201; G05D 1/0278; G05D 1/0016; G05D 1/0219; H04W 4/021; H04W 8/24; H04W 8/245; G06F 16/245; G06F 9/5072; B60K 2370/166; G01N 33/0098; G01N 2033/245
See application file for complete search history.

(56) References Cited

U.S. PATENT DOCUMENTS

| | | | |
|---|---|---|---|
| 5,663,879 A | 9/1997 | Trovato et al. | |
| 5,923,270 A | 7/1999 | Sampo et al. | |
| 6,052,647 A | 4/2000 | Parkinson et al. | |
| 6,070,673 A | 6/2000 | Wendte | |
| 6,212,453 B1 | 4/2001 | Kawagoe et al. | |
| 6,373,432 B1 | 4/2002 | Rabinowitz et al. | |
| 6,377,889 B1 | 4/2002 | Soest | |
| 6,445,983 B1 | 9/2002 | Dickson et al. | |
| 6,539,303 B2 | 3/2003 | McClure et al. | |
| 6,611,738 B2 | 8/2003 | Ruffner | |
| 6,711,501 B2 | 3/2004 | McClure et al. | |
| 6,789,014 B1 | 9/2004 | Rekow et al. | |
| 6,819,780 B2 | 11/2004 | Benson et al. | |
| 6,865,465 B2 | 3/2005 | McClure | |
| 6,876,920 B1 | 4/2005 | Mailer | |
| 7,142,956 B2 | 11/2006 | Heiniger et al. | |
| 7,162,348 B2 | 1/2007 | McClure et al. | |
| 7,277,792 B2 | 10/2007 | Overschie | |
| 7,373,231 B2 | 5/2008 | McClure et al. | |
| 7,400,956 B1 | 7/2008 | Feller et al. | |
| 7,437,230 B2 | 10/2008 | McClure | |
| 7,460,942 B2 | 12/2008 | Mailer | |
| 7,689,354 B2 | 3/2010 | Heiniger et al. | |
| RE41,358 E | 5/2010 | Heiniger et al. | |
| 7,835,832 B2 | 11/2010 | Macdonald et al. | |
| 7,885,745 B2 | 2/2011 | McClure et al. | |
| 8,018,376 B2 | 9/2011 | McClure et al. | |
| 8,190,337 B2 | 5/2012 | McClure | |
| 8,214,111 B2 | 7/2012 | Heiniger et al. | |
| 8,311,696 B2 | 11/2012 | Reeve | |
| 8,386,129 B2 | 2/2013 | Collins et al. | |
| 8,401,704 B2 | 3/2013 | Pollock et al. | |
| 8,489,291 B2 | 7/2013 | Dearborn et al. | |
| 8,521,372 B2 | 8/2013 | Hunt et al. | |
| 8,548,649 B2 | 10/2013 | Guyette et al. | |
| 8,583,315 B2 | 11/2013 | Whitehead et al. | |
| 8,583,326 B2 | 11/2013 | Collins et al. | |
| 8,589,013 B2 | 11/2013 | Pieper et al. | |
| 8,594,879 B2 | 11/2013 | Roberge et al. | |
| 8,634,993 B2 | 1/2014 | McClure et al. | |
| 8,639,416 B2 | 1/2014 | Jones et al. | |
| 8,649,930 B2 | 2/2014 | Reeve et al. | |
| 8,676,620 B2 | 3/2014 | Hunt et al. | |
| 8,718,874 B2 | 5/2014 | McClure et al. | |
| 8,768,558 B2 | 7/2014 | Reeve et al. | |
| 8,781,685 B2 | 7/2014 | McClure | |
| 8,803,735 B2 | 8/2014 | McClure | |
| 8,897,973 B2 | 11/2014 | Hunt et al. | |
| 8,924,152 B2 | 12/2014 | Hunt et al. | |
| 9,002,565 B2 | 4/2015 | Jones et al. | |
| 9,002,566 B2 | 4/2015 | McClure et al. | |
| 9,141,111 B2 | 9/2015 | Webber et al. | |
| 9,162,703 B2 | 10/2015 | Miller et al. | |
| 9,173,337 B2 | 11/2015 | Guyette et al. | |
| 9,223,314 B2 | 12/2015 | McClure et al. | |
| 9,255,992 B2 | 2/2016 | McClure | |
| 9,389,615 B2 | 7/2016 | Webber et al. | |
| 10,832,347 B1* | 11/2020 | Westhues | G06N 3/08 |
| 2002/0072850 A1 | 6/2002 | McClure et al. | |
| 2004/0186644 A1 | 9/2004 | McClure et al. | |
| 2006/0167600 A1 | 7/2006 | Nelson, Jr. et al. | |
| 2009/0251366 A1* | 10/2009 | McClure | G05D 1/0278 342/357.31 |
| 2010/0274452 A1 | 10/2010 | Ringwald et al. | |
| 2012/0253744 A1* | 10/2012 | Schmidt | G06F 11/3065 702/182 |
| 2014/0266877 A1 | 9/2014 | McClure | |
| 2014/0277676 A1 | 9/2014 | Gattis | |
| 2015/0175194 A1 | 6/2015 | Gattis | |
| 2016/0039454 A1 | 2/2016 | Mortimer | |
| 2016/0073573 A1* | 3/2016 | Ethington | G06Q 50/02 705/7.36 |
| 2016/0091898 A1* | 3/2016 | Booher | G05D 1/0274 701/26 |
| 2016/0154108 A1 | 6/2016 | McClure et al. | |
| 2016/0205864 A1 | 7/2016 | Gattis et al. | |
| 2016/0214643 A1 | 7/2016 | Joughin et al. | |
| 2016/0252909 A1 | 9/2016 | Webber et al. | |
| 2016/0334804 A1 | 11/2016 | Webber et al. | |
| 2017/0248946 A1 | 8/2017 | Ogura et al. | |
| 2018/0146612 A1* | 5/2018 | Sauder | G06Q 10/06395 |
| 2018/0321682 A1 | 11/2018 | Matsumoto et al. | |
| 2019/0071093 A1 | 3/2019 | Ma et al. | |
| 2019/0385057 A1* | 12/2019 | Litichever | G06N 3/08 |
| 2020/0051035 A1* | 2/2020 | Rossetti | G06F 16/9024 |
| 2020/0110403 A1* | 4/2020 | Antich | G05D 1/0022 |
| 2020/0294401 A1* | 9/2020 | Kerecsen | G05D 1/0287 |
| 2020/0363796 A1* | 11/2020 | Muro | G05D 1/0088 |
| 2021/0003416 A1* | 1/2021 | Wilson | A01B 69/008 |
| 2021/0026362 A1* | 1/2021 | Wilson | B60Q 9/008 |
| 2021/0029877 A1* | 2/2021 | Vandike | A01D 69/00 |
| 2021/0029878 A1* | 2/2021 | Vandike | G01C 21/3848 |
| 2021/0034057 A1* | 2/2021 | Flajolet | G05D 1/0094 |

OTHER PUBLICATIONS

Wahlström et al., Smartphone-Based Vehicle Telematics: A Ten-Year Anniversary, 2017, IEEE, p. 2802-2825 (Year: 2017).*

Murakami et al., iFarm: Development of Cloud-based System of Cultivation Management for Precision Agriculture, 2013, IEEE, p. 233-234 (Year: 2013).*

Fahmi et al., A Prototype of Monitoring Precision Agriculture System Based on WSN, 2017, IEEE, p. 323-328 (Year: 2017).*

Noh, Kwang-Mo, Self-tuning controller for farm tractor guidance, Iowa State University Retrospective Theses and Dissertations, Paper 9874, (1990).

Van Zuydam,. R.P., Centimeter-Precision Guidance of Agricultural Implements in the Open Field by Means of Real Tim Kinematic DGPS, ASA-CSSA-SSSA, pp. 1023-1034 (1999).

USPTO, International Search Report and Written Opinion of the International Searching Authority for International Application No. PCT/US2020/043605, dated Nov. 23, 2020, pp. 14.

* cited by examiner

USING SMART-PHONES AND OTHER HAND-HELD MOBILE DEVICES IN PRECISION AGRICULTURE

The present application claims priority to U.S. Provisional Patent Application Ser. No. 62/879,252, filed on Jul. 26, 2019, and the present application is a continuation-in-part (CIP) of Ser. No. 16/570,358, filed on Sep. 13, 2019, which claims priority to U.S. Provisional Patent Application Ser. No. 62/731,698, filed on Sep. 14, 2018, each of which is incorporated by reference in its entirety.

BACKGROUND

Precision agriculture uses technologies such as global navigation satellite systems (GNSS), inertial measurement sensors, and computers to guide a tractor through a field (e.g., a farming workspace) following carefully defined paths to improve crop yield, reduce operator fatigue, comply to environmental regulations, and reduce cost. The cost of these systems limits their application to only the largest farms with the economies of large scale required to purchase them.

Reducing the cost of precision agriculture technologies can be accomplished by leveraging common smart devices such as smart-phones and tablet computers. The primary barrier to using these devices is their inherent non-determinism where disruptions to wireless communications, application processor time allocation, and multitasking can block the steering and guidance software. Disruptions to timely operation complicate smart device integration into larger systems.

Another costly aspect of precision agriculture technologies is updating the numerous programmable devices operating in agricultural vehicles with guidance and control systems, particularly to those with autosteering capabilities. These current architectures for agricultural vehicle autosteering systems may not implement a robust end-to-end wireless communication between all subsystems, while these subsystems are operating in an intermittent wireless connectivity environment (wireless network connectivity may not exist or may be unreliable where the agricultural vehicles operate). This results in costly and time-consuming processes to update software guidance systems operation in the field. In some cases, the guidance subsystem needs to be shipped back to the manufacturer so that updates can be implemented.

The disclosure that follows solves this and other problems.

SUMMARY

In various embodiments, commodity mobile devices, such as smart-phones and tables, are programmed to function as an integral part of an agricultural vehicle autosteering system, resulting in an overall reducing in the cost of precision agriculture. In one example, a precision steering computer installed on a tractor uses waypoints generated by the operator's hand-held smart-device to navigate around a field. In another example, the operator's hand-held smart-device is used to field-update software of autosteering systems and their subsystems. Examples of field-updated software include firmware, drivers, executable applications, and the like, or combinations thereof.

In the examples in which the commodity mobile device is programmed to generate waypoints, the operator's hand-held smart-device may be used as the primary interface for the operator and is one component of an entire precision agriculture guidance system. Batched, time ordered waypoints generated by the smart-device represent a list of coordinates for steering the tractor.

The explanation below uses the example of a tractor plowing a field. However, it should be understood that the precision agricultural guidance system may be used with any vehicle to perform any type of agricultural or non-agricultural operation. For example, the precision agricultural guidance system may be used on a combine to harvest a crop in a field or may be used with construction machinery on construction sites, such as when building a road.

As the vehicle moves over the field, the waypoints are consumed and discarded by the real-time steering computer in the order received from the non-real-time smart device. The path planned by the operator is generated by the smart device and the progress and status of the tractor are displayed on the same smart-device.

Waypoints, consisting of time ordered geo-location coordinates along the operator defined path, are generated on the smart-device in advance of a tractor arriving at those locations. These waypoints are created in large batches a minute or more before the precision steering computer on the tractor needs them to stay on the commanded path. Batch waypoint generation conform well with the computing architecture of non-real-time devices such as smart-devices, laptops, and desktop computers and can be sent to the real-time computer within the precision steering system using a wired connection or a wireless technology such as Bluetooth or WiFi.

Batched waypoints are stored in the precision steering computer in the order they are used for steering the vehicle along a predetermined path. In the event of a service interruption with the users smart-device or a communication failure between the smart-device and the steering computer, the steering computer can continue to pull future waypoints from the queued waypoint list ensuring the next waypoint is available. If the waypoint queue is depleted prior to the users smart-device providing the next batch of waypoints, the steering computer can notify the user to stop the tractor.

The division of computing between the real time domain of the steering computer and the non-real-time domain of the smart device is facilitated by way of the queue of waypoints are stored and transmitted as batches representing many minutes of future tractor travel.

While this summary describes a specific instance with a smart device generates an entire planned path of waypoints, it should be apparent that any source of waypoints could be used either onboard the tractor or remotely. Removing the non-real-time planning activities from the real-time steering system enables the use of internet-based control including remote operation as well as fully autonomous control from internet software-as-a-service or cloud computing sources.

In the examples in which the commodity mobile device is programmed for field updates of software (e.g., firmware) of the autosteering systems and their subsystems, the operator's hand-held smart-phone or other mobile device may be programmed with logic to utilize queues and messages in order to implement remote updates of software (e.g., firmware) throughout all subsystems despite non-robust online and offline end-to-end wireless communication between these subsystems. This allows the remote update of software (e.g., firmware) of autosteering systems and their subsystems, even when these are operation in the field without online end-to-end wireless communication (e.g., due to an intermittent wireless connectivity environment in the field or in a wireless connectivity denied environment in the field). Various embodiments may include:

A vehicle autosteering system and its subsystems, which are all comprised of software that are designed to be updated over-the-air, e.g., via wireless telecommunications mechanisms;

A vehicle autosteering system that includes online and offline queues throughout the system, which allow software updates to migrate from a remote source to the consuming subsystems;

A vehicle autosteering system comprised of a layered or linear system of software that runs across each system hardware element with the capability to issue new firmware to the next lower system (inclusive of all lower systems) using logging mechanisms abstracted from the next higher layer to avoid propagating system knowledge across all elements in the system;

A vehicle autosteering system comprised of a layered or linear system of software that runs across each system hardware element, capable of queuing messages from higher and lower elements in the system for offline and online communication, using logging mechanisms abstract from the next higher layer to avoid propagating system knowledge across all elements in this system;

A vehicle autosteering infrastructure that initiates a one-way transfer of updated software (e.g., firmware) from the administrator to the autosteering system using an infrastructure comprised of the remote server, Internet, mobile device, online and offline queues, and mobile application;

A vehicle autosteering infrastructure that initiates a two-way transfer of digital files from the administrator to the autosteering subsystems and from the autosteering subsystems to the administrator, using an infrastructure comprises of the remote server, Internet, mobile device, online and offline queues, and mobile application;

A vehicle autosteering infrastructure that also includes the end user's mobile device, which once queues to updated software to allow this user the option to updated un unlimited number of individual autosteering systems, and their subsystems, that fall within wireless range of this user's mobile device;

A vehicle autosteering device, with a subassembly that can be configured with new software, without the need for this subassembly to be connected to the rest of the system (once this update subassembly is connected to the rest of the system, software updates are then automatically disseminated to all subsystems of the autosteering system); and/or A vehicle autosteering system that monitors its many subsystems to compare each of the subsystem software versions (e.g., firmware versions) to determine if the system contains a configuration combination that is not allowed, requires a software update (e.g., a firmware update), or requires other corrective action. The different configuration combinations may be evaluated using compatibility rules which can be remotely reconfigured using wireless technology.

A layered or linear system of software may run across devices of a system with the ability to issue new firmware to the next lower system (inclusive of all lower devices), queue messages from higher and lower devices for offline and online communication, use logging mechanisms abstracted from the next higher layer to avoid propagating system knowledge across all devices in the system.

Guidance systems often employ software (e.g., firmware) that needs to be updated. Some embodiments allow an administrator to upload the updating software to the Cloud, where it is queued. The Cloud may then communicate with the end user's mobile device to notify the end user that updates are available for download from the Cloud. The end user may download the updates from the Cloud to this user's mobile device, where it is again queued. Once the end user's mobile device is within wireless communication range of the precision guidance system to be updated (which may or may not be in use in the field), the mobile bridge application may then transfer the queued updated software from the mobile device to subsystems of the precision guidance system. According to various embodiments, the user may be prompted to approve the transfer of the queued updated software.

In some embodiments, using the process described above, once the end user's mobile device has been queued with the updated software, this user has the option to update an unlimited number of individual precision guidance systems that come within range of this user's mobile device.

In some embodiments, the processes described herein may initiate a one-way transfer of updated software from the Cloud to the precision guidance system. However, in other embodiments, the mobile bridge application may also be configured to transfer digital data generated by the subsystems of the precision guidance system to the Cloud, using similar components. In one example:

Guidance system telemetry and analytics generated by the subsystems of the precision guidance system (e.g., antenna, inertial measurement sensors, vibration sensors, magnetometer, motor temperature, motor current, subsystem voltages, etc.) are initially stored in a queue corresponding to the guidance system's onboard storage.

The digital data is then forwarded from the queue to a next queue corresponding to the end user's mobile device, once the mobile device is within wireless range of the precision guidance system.

Once the end user's mobile device has connectivity to the Cloud, the digital data is transferred from the next queue to the Cloud.

The forwarded digital data may then be made available to the administrator via the Cloud's communication infrastructure.

In some embodiments, the versions of the software used by the many subsystems may be monitored, compared in the aggregate to determine if the system has a valid combination of software, requires a software update, or some other corrective action. The different configuration combinations may be evaluated using compatibility rules that are embedded (i.e. installed during manufacture) in the precision guidance system. In some examples, these embedded compatibility rules may be remotely reconfigured using draft transmitted using the mobile bridge application.

In various embodiments, a system including an autosteering system of a vehicle, a mobile device, and a remote server may implement online and offline queues (on the mobile devices and/or on any components of the autosteering system), which may allow software updates to migrate from the source to the consuming subsystem (which may be any number of subsystem layers deep).

Additional aspects and advantages will be apparent from the following detailed description of preferred embodiments, which proceeds with reference to the accompanying drawings.

DETAILED DESCRIPTION

Using Non-Real-Time Computers for Agricultural Guidance Systems

Figure 1:
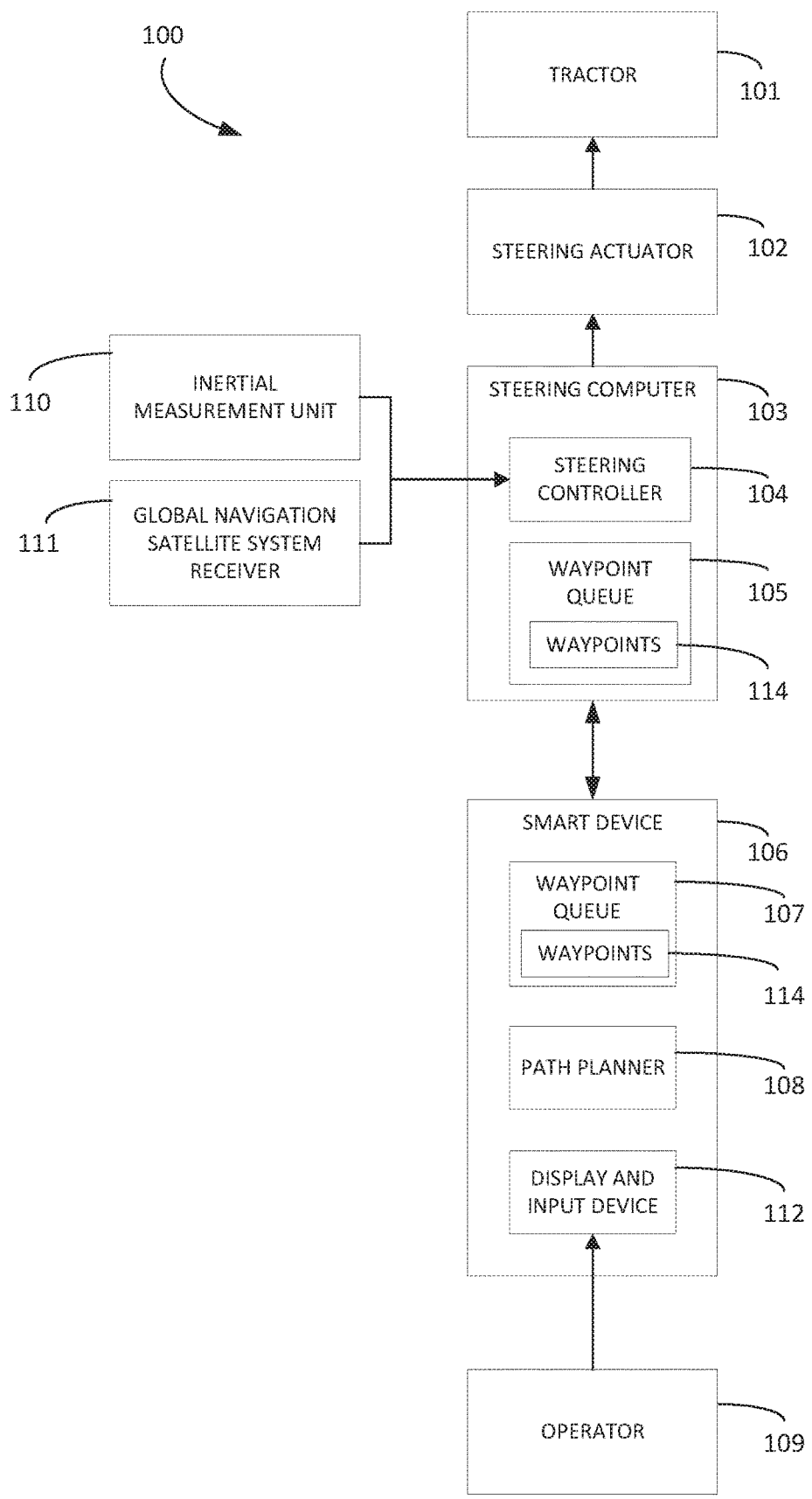
FIG. 1 illustrates a guidance steering system that steers a tractor with a non-deterministic, non-real-time guidance computer.

FIG. 1 shows a precision guidance system 100 used for steering a tractor 101. A steering computer 103 changes the attitude of tractor 101 by sending commands to a steering actuator 102 to turn a steering wheel of tractor 101 or to regulate a hydraulic steering actuator. Steering controller software 104 operated by steering computer 103 uses inputs from an inertial measurement unit (IMU) 110 and a global navigation satellite system (GNSS) 111 to compute a steering correction based on a computed error in the location of tractor 101 versus a current waypoint command from a waypoint queue 105. Steering computer 103 is known to those skilled in the art and are therefore not described in further detail. One example steering computer is sold by AgJunction, Inc., 9105 E. Del Camino Dr. #115 Scottsdale, Ariz. USA 85258.

A tractor operator 109 uses a smart device 106 to plan a route for tractor 101 through a field. Smart device 106 may be a smart phone, tablet computer, laptop computer, or any other portable or handheld device. The tractor operator 109 uses path planner software 108 operating in smart device 106 when prepare the path for automatically steering tractor 101. Path planning software, such as chart plotters, are known to those skilled in the art and are therefore not described in further detail.

The output of path planner 108 is a time ordered series of waypoints 114 stored in an output waypoint queue 107 of smart device 106. Smart device 106 transmits waypoints 114 in output waypoint queue 107 via wireless or wired communication channel to a receiving input waypoint queue 105 in steering computer 105. For example, waypoints 114 may be transmitted via a WiFi or Bluetooth wireless connection or via a universal serial bus (USB) wired connection.

To facilitate efficient data transfers, smart device 106 may send waypoints 114 in batches to steering computer 103. Steering controller 104 consumes received waypoints 114 from local input waypoint queue 105 as tractor 101 travels over the commanded location within each waypoint 114. For example, steering controller 104 steers from a current location to a next waypoint 114 in waypoint queue 105. After reaching the next waypoint 114, steering controller 104 steers to a next subsequently stored waypoint 114 in waypoint queue 105.

Figure 2:
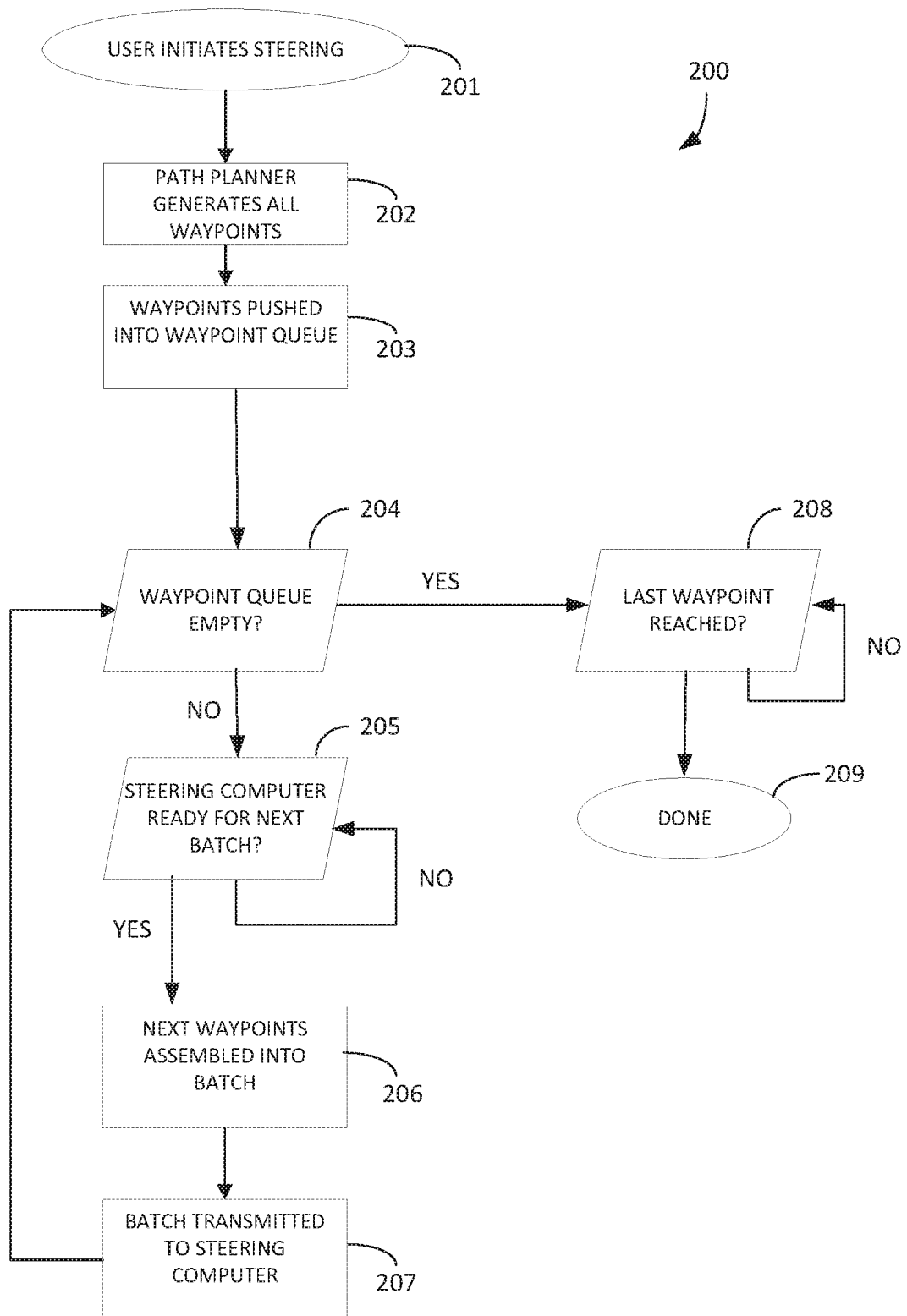
FIG. 2 illustrates operations of the precision guidance system shown in FIG. 1.

FIG. 2 shows an overall process 200 for computing, communicating, and executing steering operations based on a series of waypoints 114. Referring to FIGS. 1 and 2, tractor operator 109 in operation 201 initiates automatic steering process 200 where smart device 106 generates waypoints 114 and steering computer 103 generates steering commands based on waypoints 114.

In operation 202, path planner 108 in smart device 106 uses a previously defined path through a field defined by tractor operator 109 to generate a time series of waypoints 114. For example, smart device 106 may include a user interface 112 with a display and keyboard or touch screen input. Path planner 108 may display an electronic map of a field on user interface 112. Operator 109 then may select points on the electronic map to create a field path for tractor 101. Path planner 108 may generate a set of waypoints 114 that each include a latitude, longitude, and a time identifier indicating the order waypoints 114 were selected by operator 109.

In operation 203, smart device 106 pushes waypoints 114 into waypoint queue 107 prior to transmission. Smart device 106 then transmits a group or batch of the waypoints 114 for the field path to waypoint queue 105 in steering computer 103.

In operation 204, smart device 106 enters a loop waiting for waypoint queue 107 in smart device 106 to be empty 204 which indicates the last waypoints 114 of the path have been transmitted by smart device 106 to steering computer 103.

Prior to transmitting waypoints 114 to steering computer 103, smart device 106 in operation 205 queries steering computer 103 for the status of waypoint queue 105. If input queue 105 in steering computer 103 is full, or steering computer 103 is busy, smart device 106 will hold-off transmitting additional waypoints 114 and wait before querying steering computer 103 again. This buffering protocol allows use of a low-cost shallow buffer depth for waypoint queue 105 in steering computer 103.

In operation 205, smart device 106 may receive a message back from steering computer 103 indicating steering computer 103 is ready to receive more waypoints. Smart device 106 in operation 206 then bundles a next number of waypoints from output queue 107 into a batch appropriate to the size of memory used as waypoint input queue 105. Smart device 106 in operation 207 then transmits the batch of waypoints 114 to queue 105 in steering computer 103 prior to returning to operation 204.

Smart device 208 starts operation 208 after the last waypoint 114 is transmitted from waypoint queue 107 to waypoint input queue 105 in the steering computer 103. Smart device 106 then continuously queries steering computer 103 in operation 208 waiting for tractor 101 to reach the last waypoint. When smart device 208 receives a message back from steering computer 103 indicating the last waypoint has been reached, smart device 106 in operation 209 may display a message on user interface display 112 indicating tractor 101 has reached the end of the selected path.

As mentioned above, precision steering system 100 includes a first navigation computing device 106 configured to generate a time series of geo-location waypoints 114 for a path. Second steering computing device 103 includes input buffer 105 configured to receive the geo-location waypoints from first navigation computing device 106. Second computing device 103 is configured to generate steering commands for steering vehicle 101 based on waypoints 114 received by input buffer 105.

First navigation computing device 106 may be a non-real-time computer configured to run path planning software on a best-effort schedule and second computer 103 may be a real-time computer running steering control software at a periodic rate. In one example, first navigation computing device 106 may operate on a handheld smart device and the second steering computing device 103 may operate on a dedicated vehicle steering control system coupled to steering actuator 102 that steers vehicle 101 based on the steering commands.

First navigation computing device 106 may transmit geo-location waypoints 114 to input buffer 105 on second computer 103 over a wireless network. In another example, first navigation computing device 106 may transmit geo-location waypoints 114 in batches to input buffer 105 in second computer 103.

In one example, second steering computing device 106 uses input buffer 105 as a First-In-First-Out (FIFO) queue for processing geo-location waypoints 114. In another example, second steering computing device 103 is configured to send status messages to first navigation computing device 106 indicating when the First-In-First-Out queue is ready to accept additional geo-location waypoints 114.

In one example, first navigation computing device 106 includes output buffer 107 for storing the geo-location waypoints 114. First navigation computing device 106 also may operate output buffer 107 as a First-In-First-Out (FIFO) queue first buffering geo-location waypoints 114 and then transmitting the buffered geo-location waypoints 114 to second steering computing device 103.

In one example, path planner 108 repeatedly sends queries to steering controller 104 to check for available space in queue 105. Additional batches of waypoints 114 are sent to queue 105 based on the available space. For example, second steering computing device 103 may send a first message to first navigation computing device 106 indicating input buffer 105 is approaching capacity for storing the geo-location waypoints 114. The message may cause first navigation computing device 106 to stop sending additional geo-location waypoints 114 until receiving a second continue transmitting message from second steering computing device 103.

In another example, second steering computing device 103 is configured to send a message to first navigation computing device 106 indicating a current capacity of input buffer 105. First navigation computing device 106 may decide to send additional geo-location waypoints 114 to second steering computing device 103 based on the current capacity of input buffer 105. In one example, first navigation computing device 106 is configured to encode geo-location waypoints 114 transmitted to second steering computing device 103 to reduce transmission errors. For example, first navigation computing device 106 may use orthogonal frequency-division multiplexing (OFDM) to overcome errors in mobile communication channels.

As also explained above, a first program, such as path planner 108, generates a time series of future geo-location waypoints 114 for a selected vehicle path and transmits waypoints 114 over a communication channel to an asynchronous buffer 105. A second program, such as steering controller 104, generates steering commands for steering vehicle 101 based on the geo-location waypoints 114 in buffer 105.

In another embodiment, a same computing device 106 or 103 runs first program 108 and second program 104. In another example, first computing device 106 runs first program 108 and second computing device 103 operating asynchronously from first computing device 106 runs second program 104. In one example, first program 108 and second program 104 run on separate processor cores in a same physical central processing unit.

In another example, first program 108 and second program 104 run on a same processing device 106 or 103 controlled by a time partitioned operating system. In yet another example, first program 108 and second program 104 may run on a same processing device 106 or 103. An operating system running on the processing device 106 or 103 may asynchronously generate target waypoints 114 with first program 108 and the steering commands with second program 104.

Utilizing smart device 208 in conjunction with steering computer 103 provides many technical computing advantages. For example, a large amount of memory storage can be offloaded onto start device 106. Further, the computational and memory requirements for operating electronic maps, chart plotters/path planners, and display and user input interfaces can all be offloaded to smart device 106 or to cloud based services accessed by smart device 106. In addition, any wireless communication hardware or software needed to communicate with a central server or cloud based services that may provide electronic maps and path planning software can also be offloaded to smart device 106 and/or the cloud based service.

Precision agriculture guidance system 100 lowers the cost of precision agriculture to improve yield, reduce fatigue, and lower ecological impact of farming. It enables a commodity processing platform such as a smart-phone or tablet to act as the user interface and path planning element of an agricultural guidance system. It maintains the safety capabilities of existing systems while adding flexibility to use lower cost, non-proprietary hardware for the user interface, path planning, logging, diagnostics, and connectivity functions. These advantages also include the ability to scale a single guidance system into a larger coordinated fleet without requiring expensive on-premises computing or communications hardware.

Figure 3:
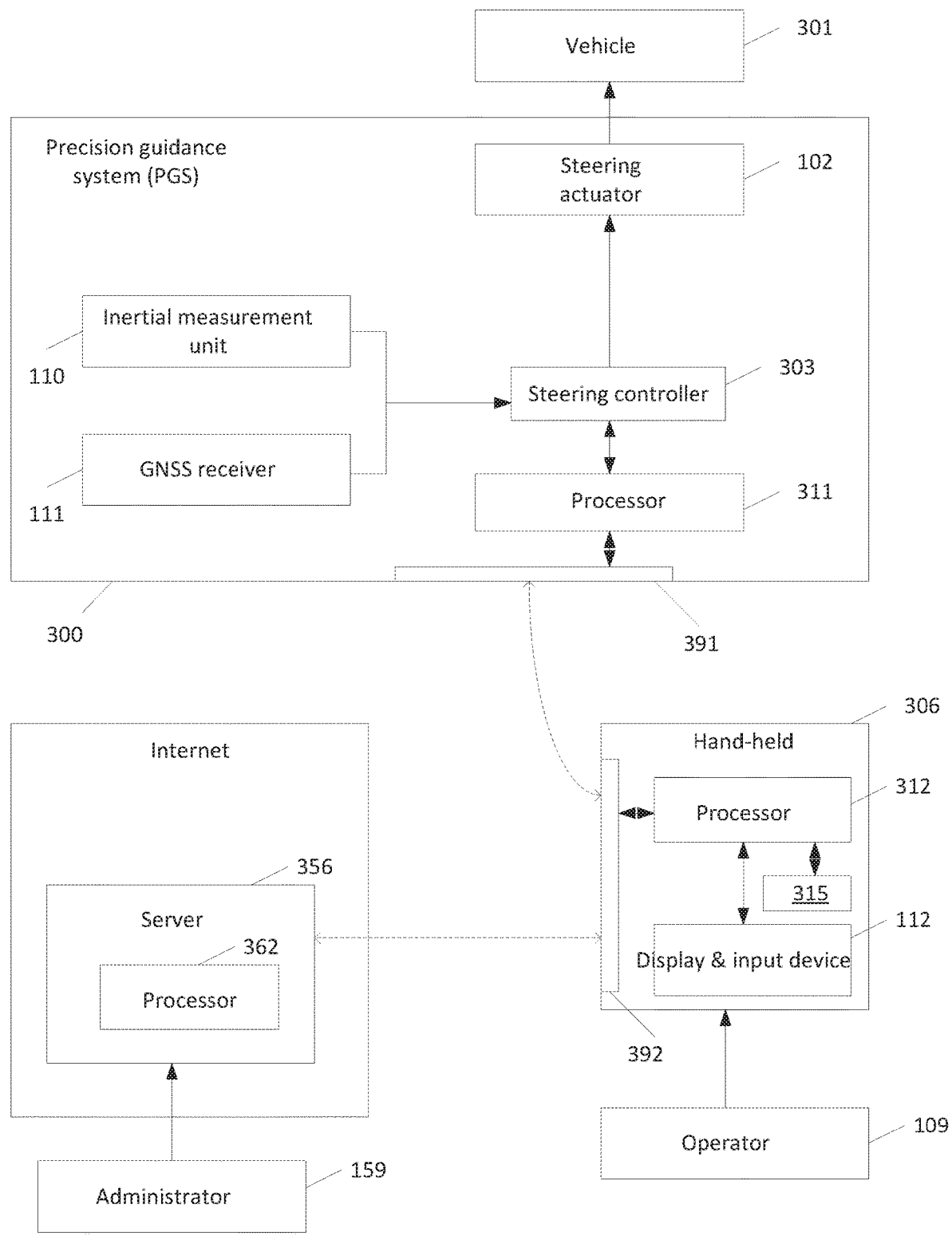
FIG. 3 illustrates an autosteering system with programmable subsystems, a hand-held to host a mobile bridge application, and a remote server.

Field-Updating of Programmable Devices in Unreliable and Wireless Connectivity Denied Environments FIG. 3 shows a system 305 including a precision guidance system 300 used for steering a vehicle 301 to operate in a field, such as tractor 101 (FIG. 1) or some other heavy machine that the precision guidance system 300 steers along a planned path. The precision guidance system 300 may be similar to precision guidance system 100 (FIG. 1) in any respect. In some embodiments, it may be advantageous to include, in the precision guidance system 300, the waypoint queue 105 described with respect to FIG. 1, although this is not required.

According to various embodiments, the precision guidance system 300 may include positioning subsystems (e.g., GNSS receiver 111, sensor systems such as inertial measurement unit 110, and other similar components described herein of current precision guidance systems or those yet to be developed), an autosteering system (which may include an actuator assembly to autosteer the vehicle 301 by actuating a steering wheel of the vehicle 301 using a steering actuator 102), and a main controller and subsystems (which may include a steering controller 303, which may be arranged similar to the steering controller 104 of FIG. 1 or any other steering controller of current precision guidance systems or those yet to be developed). Precision guidance system 300 may include other components known to one of ordinary skill in the art, such as wired and wireless subsystems, and the like, which may be under control of the main controller and subsystems. Various components of the precision guidance system 300 may be programmable, e.g., may have embedded software systems (e.g., firmware) that are updatable after manufacture of the precision guidance system 300.

The system 305 may also include a hand-held 306. This hand-held may be similar in any respects to smart device 106 (FIG. 1). In some embodiments, it may be advantageous to include the waypoint queue 107 (FIG. 1) in hand-held 306, although this not required.

The system may a server 356 or other computing resource used to perform data storage and/or calculations using a utility model (e.g., "the Cloud"), instead of the onsite server computers that may be used with some precision guidance systems.

The hand-held 306 may include a processor 312 to operate a mobile bridge application that bridges the communication between the server 356 and the programmable subsystems of the precision guidance system 300. This communication bridge may not require that the server 356 and the subsystems are concurrently online. The mobile bridge application and/or the processor 312 may perform any operations described herein to field-update of programmable devices of any precision guidance system described herein in unreliable and wireless connectivity denied environments.

The processor 312 may send messages to and/or receive messages from, a processor 311 of the precision guidance system 300 and a processor 362 of the server 356, as described herein. In some embodiments, the precision guidance system 300 may include the steering computer 103 (FIG. 1), and in these embodiments the processor 311 may be one of the processor(s) of the steering computer 103 or may be higher level processor that communicates with the processor(s) of the steering computer 103. According to various embodiments, the processor 311 may be a general purpose processor (e.g., of an Engine Control Unit (ECU) of the precision guidance system 300, a steering computer, or a higher level processor) that is programmed to interoperate with the processor 312 of the hand-held 311 to perform any of the operations described herein to field-update of programmable devices of any precision guidance system described herein in unreliable and wireless connectivity denied environments.

The remote processor 312 (e.g., in the server 356 or some other cloud/network device) may send messages to or from the processor 312 perform any of the operations described herein to field-update of programmable devices of any precision guidance system described herein in unreliable and wireless connectivity denied environments. In some embodiments, the processor 312 may provide guidance services for the vehicle 301 or a corresponding fleet of vehicles on digital data uploaded from the processor 312.

In some embodiments of system 305, an administrator 159 may upload new software (e.g., autosteering firmware) to the server 356. In an example, the operator 109 may be notified that software (e.g., the autosteering firmware) is available for download.

Using the mobile bridge application, the operator 109 may connect to the server 356 (or an online storage associated therewith) and download the updated software to a storage 315 on the hand-held 306. The download may be over any interface 392 of the hand-held 306—to name some examples: a long range wireless interface (such as WiFi) associated with a data connection of the hand-held 306, a short range wireless interface (such as a Bluetooth connection) to an Internet-connected device, a wired peripheral interface, say, a USB connection to an Internet-connected device, etc. In the case the operator 109 uses the vehicle 301 in an unreliable and wireless connectivity denied environment, the operator 109 may perform the download at a time before the hand-held 306 is carried by the operator into the unreliable and wireless connectivity denied environment.

Later, the operator 109 may carry the hand-held 306 to within wireless connectivity range of precision guidance system 300. In one example, an interface 391 of the precision guidance system 300 may operate according to Bluetooth (or some other short range wireless protocol). The hand-held 306 may be carried into range of the Bluetooth protocol and the interfaces 391 and 392 may automatically pair based on the proximity. With or without prompting the operator 109, the mobile bridge application may download the software from the storage 315 to the precision guidance system 300. Some embodiments may be configured to wait for the operator 109 to perform some action to connect the hand-held 306 via a wired or wireless connection (such as plug in a connector, trigger wirelessly pairing, etc.) Various technologies that may be used for the connection between the interfaces 391 and 392 may include Bluetooth, WiFi, LoRa, Infra-Red, etc.

The precision guidance system 300 may inspect the software (e.g., firmware) to extract information that will allow updates to be distributed to the various subsystems (e.g., autosteering subsystems such as the steering actuator 102 and related components, the receiver subsystems such as the GNSS receiver 111 and related components, a main controller such as the steering controller 303 and related components, and other wired and wireless subsystems in the precision guidance system 300).

In one embodiment, the system 305 may monitor the many subsystems of the precision guidance system 300, comparing each of the subsystem software versions (e.g., firmware versions) to determine if the system contains a configuration combination that is not allowed, requires a software update, or requires corrective actions. Corrective actions may involve messaging the operator 109 in the field via indicators displayed/output by a display on the vehicle 301 or the display of user interface 112, or via messaging the administrator 159 as wireless connectivity allows.

The precision guidance system 300 may be updated with the downloaded software. Some or all of the individual components of the various subsystems of the precision guidance system 300 based on allowed configuration combinations.

It should be appreciated that the hand-held 306 may be carried into range of other precision guidance systems similar to precision guidance system 300. For instance, the vehicle 301 may be part of a group of vehicles each having individual precision guidance systems similar to precision guidance system 300. For instance, a fleet of tractors 101 (FIG. 1) or a group of different vehicles (such as tractor and one or more other vehicles with one or more individual guidance systems, respectively, e.g., vehicles that work with the tractor such as balers, combines, sprayers, drones, etc. (some or all of these other vehicles may be an implement attached to the vehicle 301 in various embodiments). Each additional individual precision guidance system may perform downloads from the same storage 315 as the hand-held 306 is carried into range of each of the additional individual precision guidance systems.

In some embodiments, each time that the precision guidance system 300 is updated (or each time other individual precision guidance systems are updated), a notification may be sent to the operator 109 by the corresponding precision guidance system display or the display of user interface 112. Also, the mobile bridge application and/or the precision guidance system 300 may notify the server 356 and/or the administrator 159 about the updates. The notification to the server 356 may occur as connectivity allows, e.g., as the hand-held 306 is carried in range of a base station that can communicate through network infrastructure with the server 356. In some examples the remote server 6 may generate display data describing the update and/or the currently installed combinations to the administrator 159.

One example computing device in the system 300, which may be programmed to download software updates and/or upload generated digital data, is the ECU described in pending U.S. patent application Ser. No. 15/878,849 entitled INTEGRATED AUTO-STEER SYSTEM FOR VEHICLE, filed Feb. 13, 2018, which is incorporated by reference in its entirety. The '849 application also describes various other hardware and software components which may be employed in system 300 or a similar system (for example the programmed ECU may download a software update to any software or hardware elements described in the '849 application, such as the chassis assembly (the structure that attaches to the steering wheel to steer the vehicle by actuating the steering wheel), or any of its components.

In one example, an ECU assembly on the vehicle may be updated while the ECU assembly is disconnected from the autosteering system (e.g., disconnected from an actuator chassis and/or a positioning system. Once the updated ECU assembly is connected to the rest of the autosteering system, it may automatically disseminate software updates to the connected subsystems. In one example, the ECU may access the offline queue corresponding to the storage 315 of the hand-held 306 in order to automatically disseminate the software updates. In another example, the ECU assembly may include a local storage for an offline queue that can be accessed in the case that the connection to the hand-held 306 is not available at the time of automatically disseminating the software updates. In such a case, the ECU assembly may message the hand-held 306 about the software updates once a connection is available.

The compatibility rule downloaded to the system 300 may be used by the computing device to monitor its subsystems, comparing each of the subsystem software versions to the updated computability rule to determine of the system contains a configuration combination that is not allowed, requires a software update, or requires other corrective actions. This feature may be useful in many cases, including when pre-configured field-replaceable subsystems are swapped in the field, which could lead to an incompatible subsystem configuration combination.

An autosteering system that may be field-updated using any operations described herein may include a system of components used to measure the position and speed of a tractor, compute and apply a steering correction, and interface with the operator to follow the operator's planned path. The autosteering system may include an interface by which it can communicate with the operator's mobile device.

Figure 4:
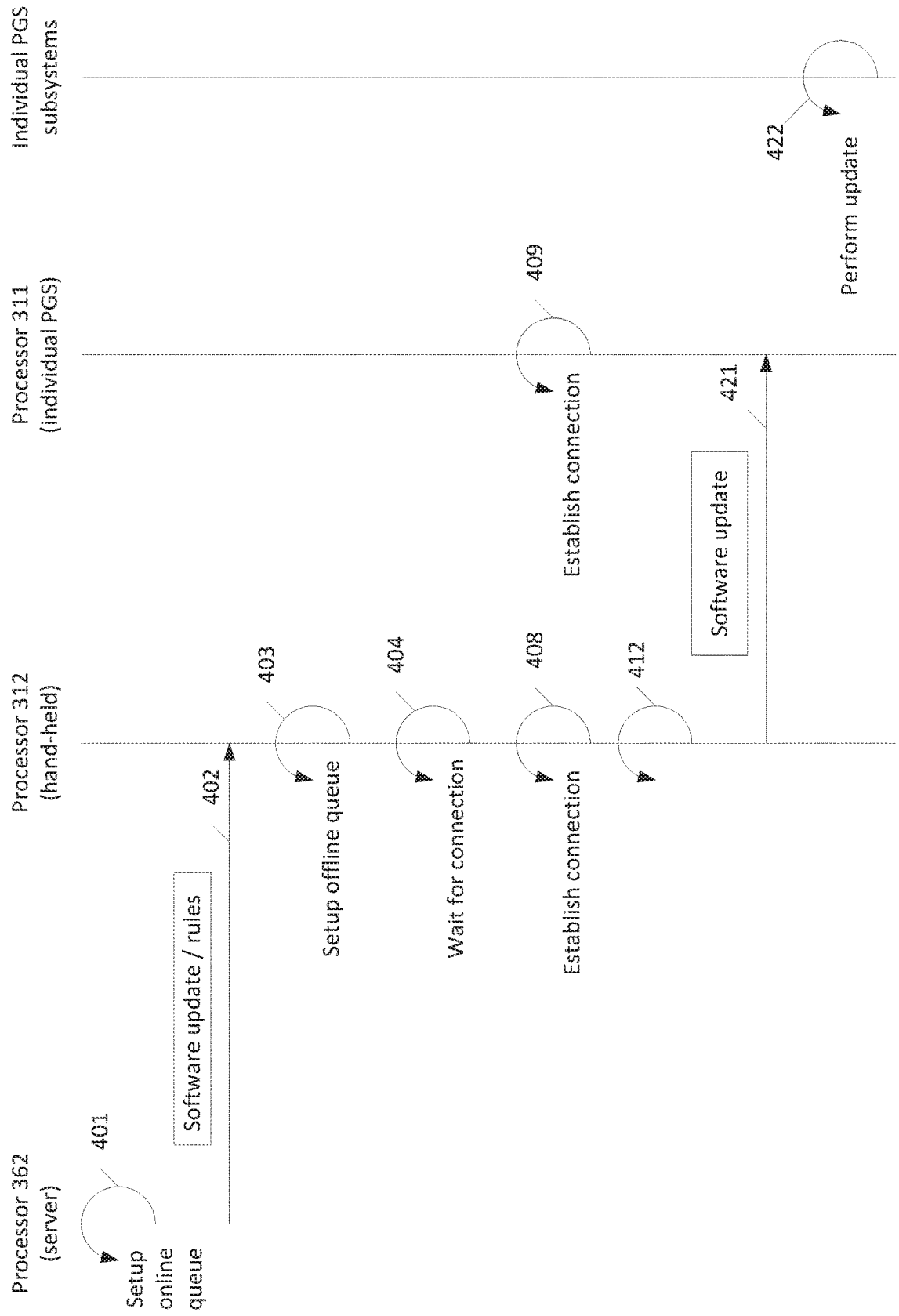
FIG. 4 illustrates operations performed by the system shown in FIG. 3, according to various embodiments.

FIG. 4 illustrates operations performed by the system 300 shown in FIG. 3, according to various embodiments. In operation 401, the processor 362 stores a software update and/or an update to compatibility rules (the update may include a compatibility rule that is different than compatibility rules embedded in the PGS 300) in an online queue. In some embodiments, the processor 362 may message (not shown) the processor 312 to obtain operator approval to perform a download from the online queue.

In some embodiments, after downloading contents from the online queue (operation 402), in operation 403 the processor 312 may evaluate a current configuration of the individual PGS 300 based on the compatibility rules. The processor 312 may select individual PGS subsystem(s) to be updated based on this evaluation. The processor 312 may provide an offline queue, using storage 315, for the individual PGS 300 based on the evaluation. The data in the offline queue may include updates for individual PGS subsystems(s) selected for updating. In some embodiments, the data in the offline queue may also include the compatibility rules to update embedded rules of the individual PGS 300.

The processor 312 may wait 404 for a connection to the individual PGS 300. In operations 408 and 409, the processors 312 and 311 identify a connection established between the interfaces 392 and 391. This may occur when the operator 109 attaches the hand-held 306 to the individual PGS 300 by a wire or when the operator 109 carries the hand-held 306 into range of, say, a short range wireless protocol (such as Bluetooth). In operation 421, a software update is downloaded to the individual PGS 300. The processor 311 may control updating of selected individual PGS subsystem(s) in operation 422 based on this downloaded software update.

While typically the processor 312 may setup the offline queue responsive to downloading the data from the online queue, it may be possible for the processor 312 to identify the individual PGS 300 after the connection is established (say, by receiving a unique identifier from the processor 311 over the connection), and transmit data from the storage 315 responsive to identification (the transmitted data may be based on an evaluation of the rules based on and responsive to the identification of the individual PGS 300).

In the above-described embodiment, the processor 312 may evaluate the compatibility rules and select individual PGS subsystem(s) to be updated. In other embodiments, it may be possible and practical for the processor 312 to load the compatibility rules into an offline queue together with the contents from the online queue to allow the processor 311 to perform the evaluation and select the individual subsystem(s) to updated. In such an embodiment, the offline queue may include all of the data from the online queue, and the processor 311 may evaluate the compatibility rules once it receives them and select which individual subsystem(s) to be updated form the data.

Figure 5:
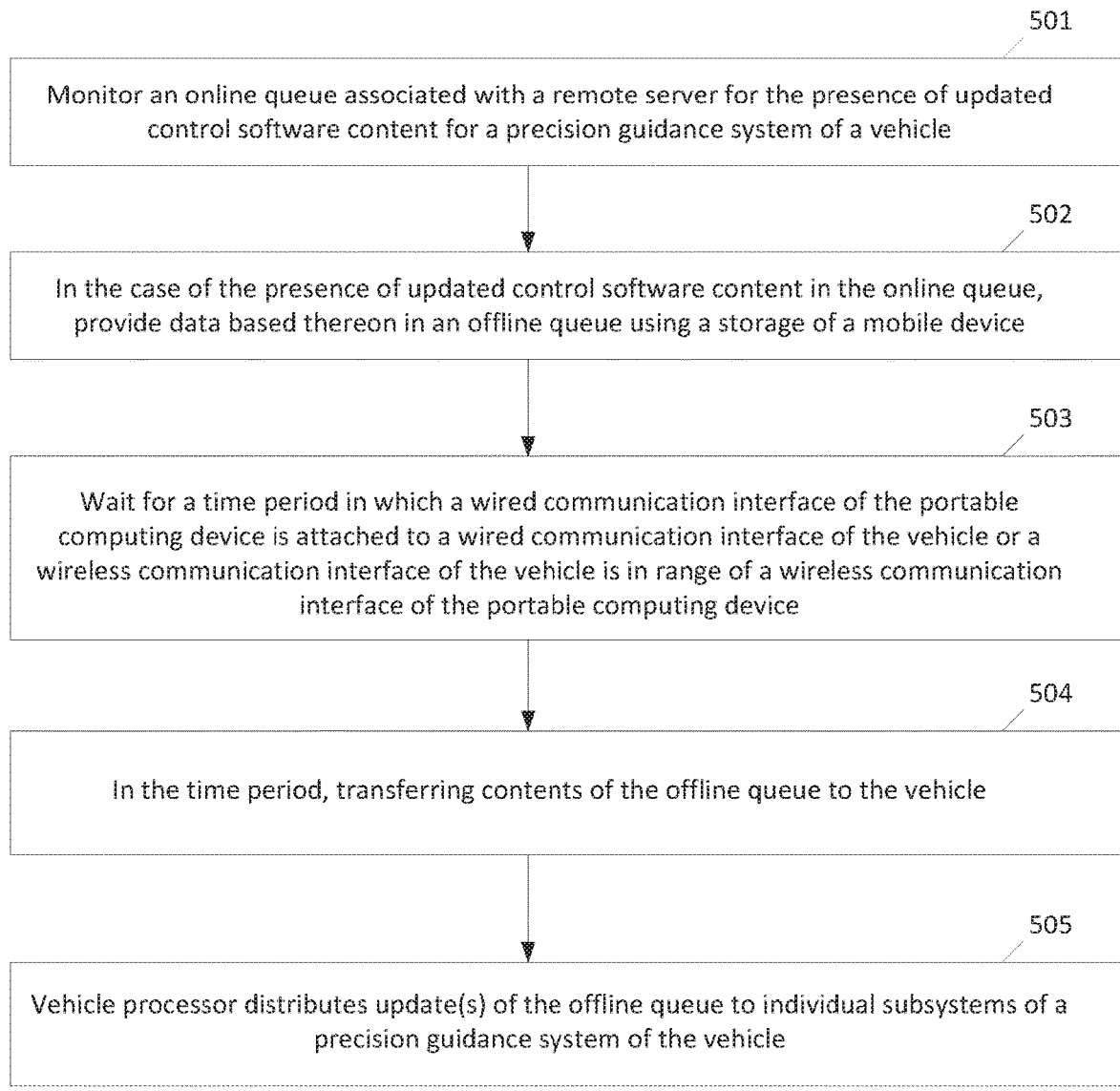
FIG. 5 illustrates operations of a system including a group of processors to field-update programmable devices of a vehicle in unreliable and wireless connectivity denied environments.

FIG. 5 illustrates operations of a control system including a group of processors (e.g., two or more) to field-update programmable devices of a vehicle in unreliable and wireless connectivity denied environments. A first mobile processor of the group may operate in a portable computing device that is similar in any respects to the hand-held 306 (FIG. 3). A second vehicle processor of the group may be a main or higher level vehicle processor (to control the programmable devices of the vehicle), which may be similar in any respect to processor 311 (FIG. 3).

The control system may be configured to monitor an online queue associated with a remote server for the presence of updated control software content for a precision guidance system of a vehicle in block 501. In block 502, the control system may provide data based thereon in an offline queue using a storage of the portable computing device.

In block 503, the control system may wait for a time period in which a wired communication interface of the portable computing device is attached to a wired communication interface of the vehicle or a wireless communication interface of the vehicle is in range of a wireless communication interface of the portable computing device.

In the time period, the system may transfer contents of the offline queue to the vehicle in block 504.

In block 505, the vehicle processor may distribute update(s) of the offline queue to individual subsystems of the precision guidance system of the vehicle.

In some embodiments, blocks 503-505 may be repeated for one or more additional vehicles having one or more individual precision guidance systems, respectively. The additional vehicle(s) include drones or implements (or the like) of the vehicle, or some other auxiliary vehicle to a primary vehicle, in some example. Additionally or alternatively, the additional vehicle(s) may be other vehicles operated by one or more additional operators.

Figure 6:
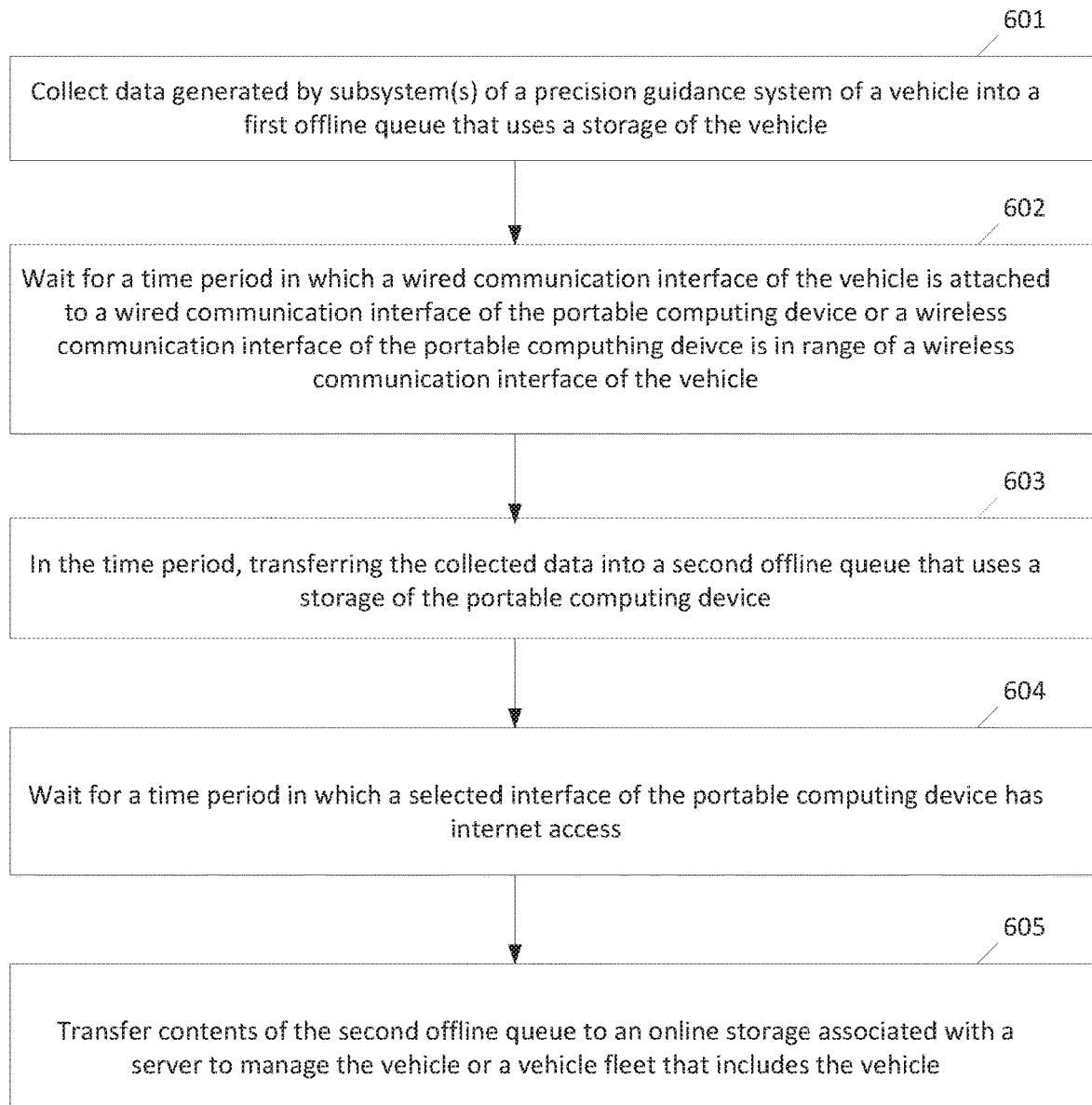
FIG. 6 illustrates operations of a system including a group of processors to upload guidance system telemetry generated by precision guidance system of a vehicle to the cloud in unreliable and wireless connectivity denied environments.

FIG. 6 illustrates operations of a system including a group of processors to upload guidance system telemetry generated by precision guidance system of a vehicle to the cloud in unreliable and wireless connectivity denied environments. A first mobile processor of the group may operate in a portable computing device that is similar in any respects to the hand-held 306 (FIG. 3). A second vehicle processor of the group may be a main or higher level vehicle processor (to control the programmable devices of the vehicle), which may be similar in any respect to processor 311 (FIG. 3).

In block 601, the system may collect data generated by subsystem(s) of a precision guidance system of a vehicle into an offline queue that uses a storage of the vehicle. In block 602, the system may wait for a time period in which a wired communication interface of the portable computing device is attached to a wired communication interface of the vehicle or a wireless communication interface of the portable computing device is in range of a wireless communication interface of the vehicle. In block 603, in the time period, the system may transfer the collected data into a second offline queue that uses a storage of the portable computing device.

In block 604, the system may wait for a time period in which a selected interface of the portable computing device has internet access (e.g., wait for a WiFi connection). In block 605, the system may transfer contents of the second offline storage to an online storage associated with a server to manage the vehicle or a vehicle fleet that includes the vehicle. The server may receive similar data from other vehicles in the fleet, and may use the aggregated data to perform various guidance system services for the vehicle and/or the fleet.

EXAMPLES

Example 1 is an apparatus including a programmable autosteering assembly and a portable computing device, wherein the programmable autosteering assembly includes a Global Navigation Satellite System (GNSS) receiver, an actuator assembly arranged to attach to a steering wheel of a vehicle, and a steering control module coupled to the GNSS receiver and the actuator assembly, the steering control module to generate steering commands based on positioning information from the GNSS receiver, the steering commands arranged to actuate the steering wheel to autosteer the vehicle, wherein the GNSS receiver, the actuator assembly, and the steering control module include control software, respectively, that is individually updatable using control software distributed by a remote server, the apparatus comprising: a control system configured to: monitor an online queue associated with the remote server for the presence of updated control software content; in the case of the presence of updated control software content in the online queue, provide data based thereon in an offline queue, wherein the portable computing device includes a storage for the offline queue; waiting for a time period in which a wired communication interface of the portable computing device is attached to a wired interface of the vehicle or a wireless communication interface of the vehicle is in range of a wireless communication interface of the portable computing device; and in the time period, transferring contents of the offline queue to the vehicle, wherein the control system includes a processor in the programmable autosteering assembly to distribute update(s) included in the contents to one or more of the GNSS receiver, the actuator assembly, and the steering control module.

Example 2 includes the subject matter of example 1 (or any other example here), wherein the control system is further configured to: analyze version information of the control software in the vehicle, wherein the version information is obtained from the server or the vehicle; and identify said one or more of the GNSS receiver, the actuator assembly, and the steering control module based on a result of the analysis of the version information.

Example 3 includes the subject matter of any of examples 1-2 (or any other example herein), wherein the contents of the offline queue include one or more values specifying a compatibility rule different than compatibility rules embedded in a programmable memory of the vehicle at a time of manufacture, wherein the processor updates the programmable memory with the one or more values.

Example 4 includes the subject matter of any of examples 1-3 (or any other example herein), wherein the processor comprises a first processor, and wherein the control system further includes a second processor in the portable computing device, wherein the evaluation is performed by the second processor, and wherein the second processor selects from the updated control software content based on the evaluation to provide the data in the offline queue.

Example 5 includes the subject matter of any of examples 1-4 (or any other example herein), wherein the control system is further configured to: collect data generated by the GNSS receiver, the actuator assembly, and the steering control module into an offline queue that uses a storage of the vehicle; in the time period, transferring the contents of the offline queue that uses the storage of the vehicle into the offline queue that uses the storage of the portable computing device; and wait for a time period in which a selected interface of the portable computing device has internet access; and in the time period in which the selected interface of the portable computing device has internet access, transfer contents of the offline queue that uses the storage of the portable computing device to an online storage associated with the remote server.

Example 6 includes the subject matter of any of examples 1-5 (or any other example herein), further comprising an inertial measurement device, wherein the processor distributes the update(s) included in the contents to the inertial measurement device.

Example 7 includes the subject matter of any of examples 1-6 (or any other example herein), wherein the processor comprises an ECU (engine control unit) of the programmable autosteering assembly.

Example 8 includes the subject matter of any of examples 1-7 (or any other example herein), wherein the ECU is configured to monitor version numbers of software used in subsystems of the programmable autosteering assembly based on an updated compatibility rule included the contents of the offline queue for exceptions.

Example 9 includes the subject matter of any of examples 1-8 (or any other example herein), wherein the subsystems of the programmable autosteering assembly are arranged to individually attach to the vehicle and the ECU is configured to analyze a version number of software of a replacement subsystem based on the updated compatibility rule.

Example 10 includes the subject matter of any of examples 1-9 (or any other example herein), wherein the control system is further configured to download updated control software content from the online queue using a first network interface of the portable computing device and transfer contents of the offline queue to the vehicle over a second different interface of the portable computing device.

Example 11 is a method of using a portable computing device with two or more individual guidance systems of two or more vehicles, respectively, the method comprising: monitoring an online queue associated with a remote server for the presence of updated control software content; in the case of the presence of updated control software content in the online queue, providing data based thereon in two or more offline queues corresponding to the two or more individual guidance systems, respectively, wherein the portable computing device includes a storage for the two or more offline queues; and following providing the data in the two or more offline queues, for each of the vehicles, waiting for a time period in which a wired communication interface of the portable computing device is attached to a wired interface of the vehicle or a wireless communication interface of the vehicle is in range of at least one wireless communication interface of the portable computing device; and in each time period, transferring contents of a respective one of the two or more offline queues to the corresponding vehicle, wherein each of the individual guidance systems includes a computing device to control a plurality of subsystems of the individual guidance system, and wherein a respective one of the computing devices distributes update(s) included in the contents to a corresponding one of the plurality of subsystems.

Example 12 includes the subject matter of example 11 (or any other example herein), wherein one of the vehicles comprises an auxiliary vehicle of another one of the vehicles.

Example 13 includes the subject matter of any of examples 11-12 (or any other example herein), wherein the two or more vehicles includes two or more autosteering systems, respectively.

Example 14 includes the subject matter of any of examples 11-13 (or any other example herein), wherein the updated control software content includes one or more updated compatibility rules to supplement embedded computability rules of the vehicles.

Example 15 includes the subject matter of any of examples 11-14 (or any other example herein), further comprising: collecting data generated by the two or more individual guidance systems of two or more vehicles into two or more offline queues that use two or more storages of the two or more vehicles, respectively; transferring contents of the offline queues into an offline queue that uses the storage of the portable computing device as the portable computing device connects to the individual guidance systems; waiting for a time period in which a selected interface of the portable computing device has internet access; in the time period, transferring queued collected data from the offline queue that uses the storage of the portable computing device to an online storage associated with the remote server.

Example 16 is an apparatus to field-update two or more individual guidance systems of two or more vehicles, respectively, wherein each of the individual guidance systems includes a computing device to control a plurality of subsystems of the individual guidance system, the apparatus comprising: a control system including a group of computing devices, wherein the group of computing devices includes a computing device in a portable computing device and the computing devices to control the pluralities of subsystems, the control system configured to: monitor an online queue associated with the remote server for the presence of updated control software content; in the case of the presence of updated control software content in the online queue, provide data based thereon in at least one offline queue, wherein the portable computing device includes a storage for the at least one offline queue; and following providing the data in the at least one offline queue, wait for a time period in which a wired communication interface of the portable computing device is attached to a wired interface of a vehicle of the one or more vehicles or a wireless communication interface of the vehicle is in range of at least one wireless communication interface of the portable computing device; and in the time period, transfer contents of the at least one offline queue to the vehicle, wherein the computing device of the individual guidance system of the vehicle distributes update(s) included in the contents to the plurality of subsystems of the individual guidance system of the vehicle.

Example 17 includes the subject matter of example 16 (or any other example herein), wherein the contents of the at least one offline queue includes an updated compatibility rule for the vehicle, wherein t the computing device of the individual guidance system of the vehicle distributes the updated compatibility rule to a local store of compatibility rules.

Example 18 includes the subject matter of any of examples 16-17 (or any other example herein), wherein the at least one offline queue comprises two or more individual offline queues corresponding to the two or more individual guidance systems, respectively, and wherein in the time period the computing system transfers contents of a respective one of the two or more individual offline queues to the vehicle.

Example 19 includes the subject matter of any of examples 16-18 (or any example herein), wherein the control system is further configured to: collect data generated by the two or more individual guidance systems of two or more vehicles into two or more offline queues that use two or more storages of the two or more vehicles, respectively; transferring contents of the two or more offline queues into the at least one offline queue as the portable computing device connects to the individual guidance systems; and waiting for a time period in which a selected interface of the portable computing device has internet access; and in the time period, transferring queued collected data from the at least one offline queue to an online storage associated with the remote server.

Example 20 includes the subject matter of any of examples 16-19 (or any other example herein), wherein the individual guidance system of the vehicle includes a Global Navigation Satellite System (GNSS) receiver, an actuator assembly arranged to attach to a steering wheel of a vehicle, and a steering control module coupled to the GNSS receiver and the actuator assembly, the steering control module to generate steering commands based on positioning information from the GNSS receiver, the steering commands arranged to actuate the steering wheel to autosteer the vehicle, and wherein the computing device of the individual guidance system of the vehicle distributes update(s)

included in the contents to a processor of the GNSS receiver, a processor of the actuator assembly, or a processor of the steering control module.

Figure 7:
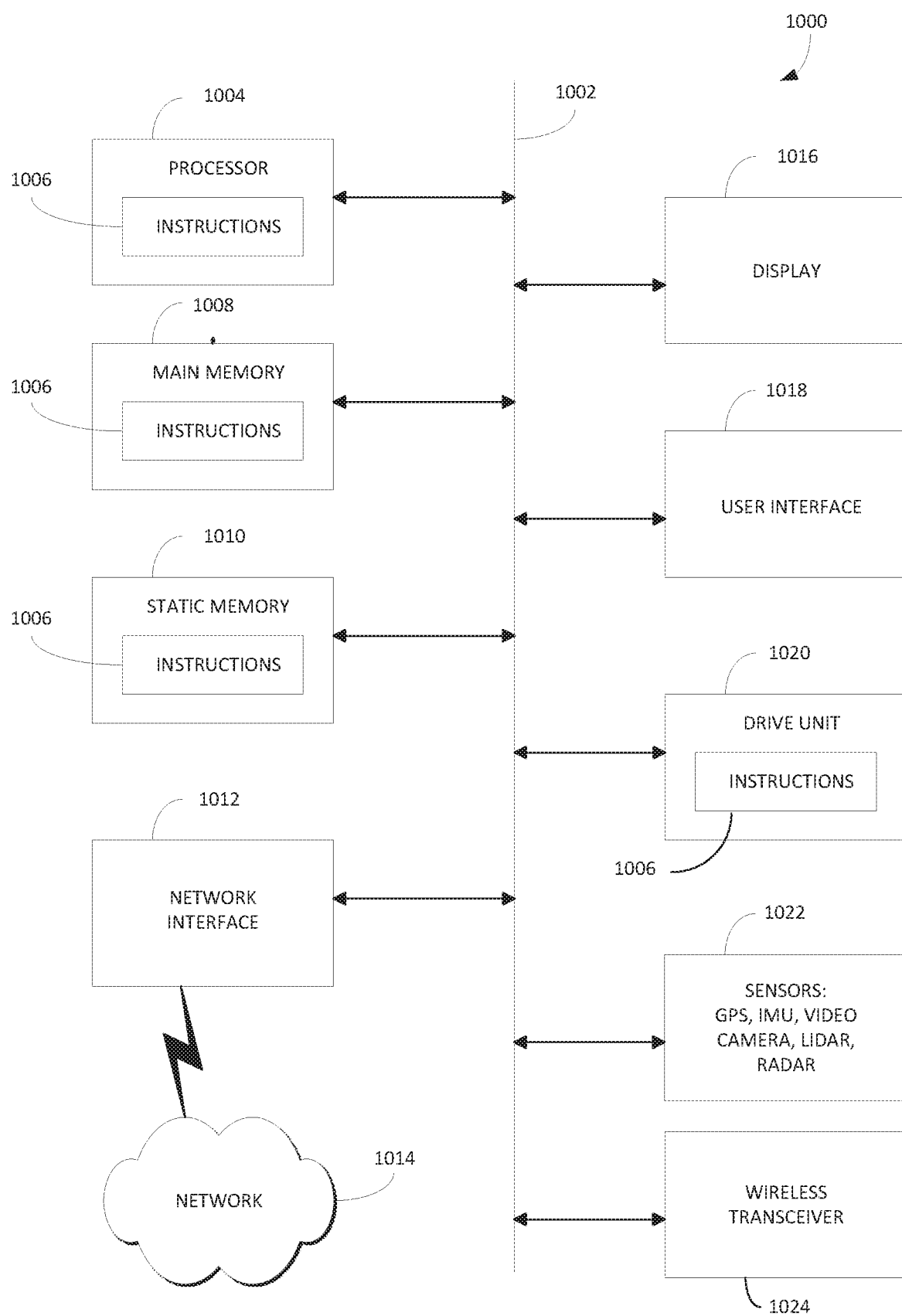
FIG. 7 shows an example computer system used in the guidance system.

FIG. 7 shows a computing device 1000 that may be used for implementing or operating any guidance and control system computers described herein (e.g., steering computer 103 in FIG. 1 or some other computer corresponding to processor 311 in FIG. 3), any hand-held of any precision guidance systems described herein (e.g., smart device 106 in FIG. 1 or hand-held 306 in FIG. 3), and any server described herein. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, central processing unit, programmable logic device, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT) and a user interface 1018, such as a keyboard, mouse, touch screen, etc. All of the components of computing device 1000 may be connected together via a bus 1002 and/or network.

Computing device 1000 may include any combination of sensors 1022 including, but not limited to, GSP, IMU, video camera, LIDAR, and radar. Computing device 100 also may include a wireless transceiver 1024 for wirelessly transmitting and receiving commands to and from other computing devices.

For the sake of convenience, operations may be described as various interconnected or coupled functional blocks or diagrams. However, there may be cases where these functional blocks or diagrams may be equivalently aggregated into a single logic device, program or operation with unclear boundaries. Having described and illustrated the principles of a preferred embodiment, it should be apparent that the embodiments may be modified in arrangement and detail without departing from such principles.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. An apparatus including a programmable autosteering assembly and a portable computing device, wherein the programmable autosteering assembly includes a Global Navigation Satellite System (GNSS) receiver, an actuator assembly arranged to attach to a steering wheel of a vehicle, and a steering control module coupled to the GNSS receiver and the actuator assembly, the steering control module to generate steering commands based on positioning information from the GNSS receiver, the steering commands arranged to actuate the steering wheel to autosteer the vehicle, wherein the GNSS receiver, the actuator assembly, and the steering control module include control software, respectively, that is individually updatable using control software distributed by a remote server, the apparatus comprising:

a control system configured to:
monitor an online queue associated with the remote server for the presence of updated control software content;

in the case of the presence of updated control software content in the online queue, provide data based thereon in an offline queue, wherein the portable computing device includes a storage for the offline queue;

waiting for a time period in which a wired communication interface of the portable computing device is attached to a wired interface of the vehicle or a wireless communication interface of the vehicle is in range of a wireless communication interface of the portable computing device; and in the time period, transferring contents of the offline queue to the vehicle, wherein the control system includes a processor in the programmable autosteering assembly to distribute update(s) included in the contents to one or more of the GNSS receiver, the actuator assembly, and the steering control module.

2. The apparatus of claim 1, wherein the control system is further configured to:

analyze version information of the control software in the vehicle, wherein the version information is obtained from the server or the vehicle; and identify said one or more of the GNSS receiver, the actuator assembly, and the steering control module based on a result of the analysis of the version information.

3. The apparatus of claim 1, wherein the contents of the offline queue include one or more values specifying a compatibility rule different than compatibility rules embedded in a programmable memory of the vehicle at a time of manufacture, wherein the processor updates the programmable memory with the one or more values.

4. The apparatus of claim 1, wherein the processor comprises a first processor, and wherein the control system further includes a second processor in the portable computing device, wherein the evaluation is performed by the second processor, and wherein the second processor selects from the updated control software content based on the evaluation to provide the data in the offline queue.

5. The apparatus of claim 1, wherein the control system is further configured to:

collect data generated by the GNSS receiver, the actuator assembly, and the steering control module into an offline queue that uses a storage of the vehicle;

in the time period, transferring the contents of the offline queue that uses the storage of the vehicle into the offline queue that uses the storage of the portable computing device; and wait for a time period in which a selected interface of the portable computing device has internet access; and in the time period in which the selected interface of the portable computing device has internet access, transfer contents of the offline queue that uses the storage of the portable computing device to an online storage associated with the remote server.

6. The apparatus of claim 1, further comprising an inertial measurement device, wherein the processor distributes the update(s) included in the contents to the inertial measurement device.

7. The apparatus of claim 1, wherein the processor comprises an ECU (engine control unit) of the programmable autosteering assembly.

8. The apparatus of claim 1, wherein the ECU is configured to monitor version numbers of software used in subsystems of the programmable autosteering assembly based on an updated compatibility rule included the contents of the offline queue for exceptions.

9. The apparatus of claim 8, wherein the subsystems of the programmable autosteering assembly are arranged to individually attach to the vehicle and the ECU is configured to analyze a version number of software of a replacement subsystem based on the updated compatibility rule.

10. The apparatus of claim 1, wherein the control system is further configured to download updated control software content from the online queue using a first network interface of the portable computing device and transfer contents of the offline queue to the vehicle over a second different interface of the portable computing device.

11. A method of using a portable computing device with two or more individual guidance systems of two or more vehicles, respectively, the method comprising:

monitoring an online queue associated with a remote server for the presence of updated control software content;

in the case of the presence of updated control software content in the online queue, providing data based thereon in two or more offline queues corresponding to the two or more individual guidance systems, respectively, wherein the portable computing device includes a storage for the two or more offline queues;

following providing the data in the two or more offline queues, for each of the vehicles, waiting for a time period in which a wired communication interface of the portable computing device is attached to a wired interface of the vehicle or a wireless communication interface of the vehicle is in range of at least one wireless communication interface of the portable computing device; and in each time period, transferring contents of a respective one of the two or more offline queues to the corresponding vehicle, wherein each of the individual guidance systems includes a computing device to control a plurality of subsystems of the individual guidance system, and wherein a respective one of the computing devices distributes update(s) included in the contents to a corresponding one of the plurality of subsystems.

12. The method of claim 11, wherein one of the vehicles comprises an auxiliary vehicle of another one of the vehicles.

13. The method of claim 11, wherein the two or more vehicles includes two or more autosteering systems, respectively.

14. The method of claim 11, wherein the updated control software content includes one or more updated compatibility rules to supplement embedded computability rules of the vehicles.

15. The method of claim 11, further comprising:

collecting data generated by the two or more individual guidance systems of two or more vehicles into two or more offline queues that use two or more storages of the two or more vehicles, respectively;

transferring contents of the offline queues into an offline queue that uses the storage of the portable computing device as the portable computing device connects to the individual guidance systems;

waiting for a time period in which a selected interface of the portable computing device has internet access; and in the time period, transferring queued collected data from the offline queue that uses the storage of the portable computing device to an online storage associated with the remote server.

16. An apparatus to field-update two or more individual guidance systems of two or more vehicles, respectively, wherein each of the individual guidance systems includes a computing device to control a plurality of subsystems of the individual guidance system, the apparatus comprising:

a control system including a group of computing devices, wherein the group of computing devices includes a computing device in a portable computing device and the computing devices to control the pluralities of subsystems, the control system configured to:

monitor an online queue associated with the remote server for the presence of updated control software content;

in the case of the presence of updated control software content in the online queue, provide data based thereon in at least one offline queue, wherein the portable computing device includes a storage for the at least one offline queue; and following providing the data in the at least one offline queue, wait for a time period in which a wired communication interface of the portable computing device is attached to a wired interface of a vehicle of the one or more vehicles or a wireless communication interface of the vehicle is in range of at least one wireless communication interface of the portable computing device; and in the time period, transfer contents of the at least one offline queue to the vehicle, wherein the computing device of the individual guidance system of the vehicle distributes update(s) included in the contents to the plurality of subsystems of the individual guidance system of the vehicle.

17. The apparatus of claim 16, wherein the contents of the at least one offline queue include an updated compatibility rule for the vehicle, wherein the computing device of the individual guidance system of the vehicle distributes the updated compatibility rule to a local store of compatibility rules.

18. The apparatus of claim 16, wherein the at least one offline queue comprises two or more individual offline queues corresponding to the two or more individual guidance systems, respectively, and wherein in the time period the computing system transfers contents of a respective one of the two or more individual offline queues to the vehicle.

19. The apparatus of claim 16, wherein the control system is further configured to:

collect data generated by the two or more individual guidance systems of two or more vehicles into two or more offline queues that use two or more storages of the two or more vehicles, respectively;

transferring contents of the two or more offline queues into the at least one offline queue as the portable computing device connects to the individual guidance systems;

waiting for a time period in which a selected interface of the portable computing device has internet access; and in the time period, transferring queued collected data from the at least one offline queue to an online storage associated with the remote server.

20. The apparatus of claim 16, wherein the individual guidance system of the vehicle includes a Global Navigation Satellite System (GNSS) receiver, an actuator assembly arranged to attach to a steering wheel of a vehicle, and a steering control module coupled to the GNSS receiver and the actuator assembly, the steering control module to generate steering commands based on positioning information from the GNSS receiver, the steering commands arranged to actuate the steering wheel to autosteer the vehicle, and wherein the computing device of the individual guidance system of the vehicle distributes update(s) included in the contents to a processor of the GNSS receiver, a processor of the actuator assembly, or a processor of the steering control module.

* * * * *